Sept. 27, 1966  E. H. CUSHMAN  3,275,786

HIGH SPEED BUTT WELDING METHOD AND APPARATUS

Filed Jan. 15, 1965  5 Sheets-Sheet 1

INVENTOR
EVERETT H. CUSHMAN
BY
Edmund W Bopp
AGENT

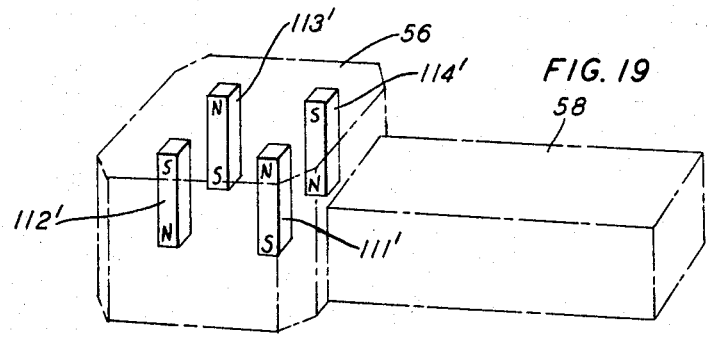
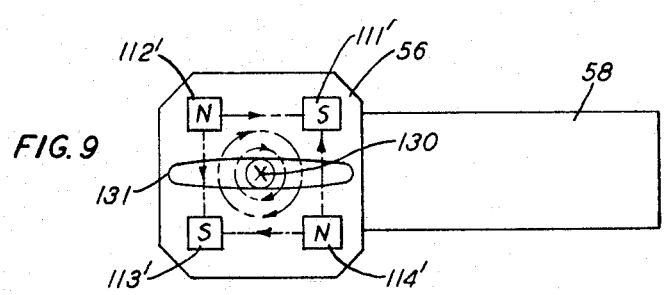
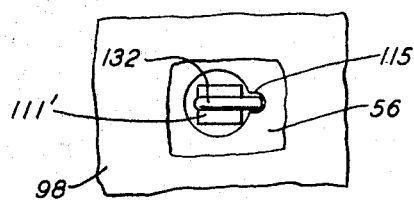
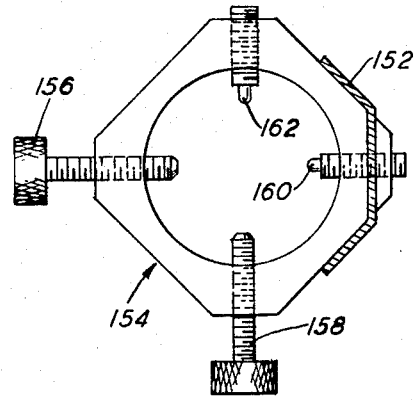
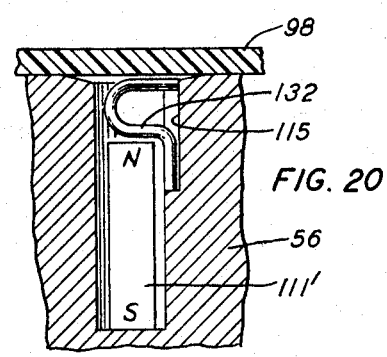
INVENTOR
EVERETT H. CUSHMAN Sept. 27, 1966    E. H. CUSHMAN    3,275,786
HIGH SPEED BUTT WELDING METHOD AND APPARATUS
Filed Jan. 15, 1965    5 Sheets-Sheet 3
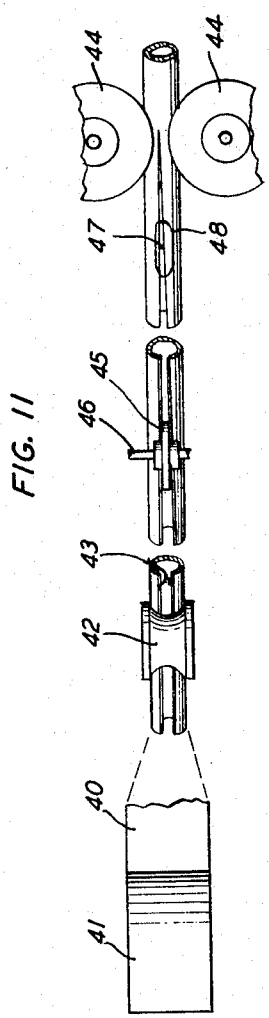
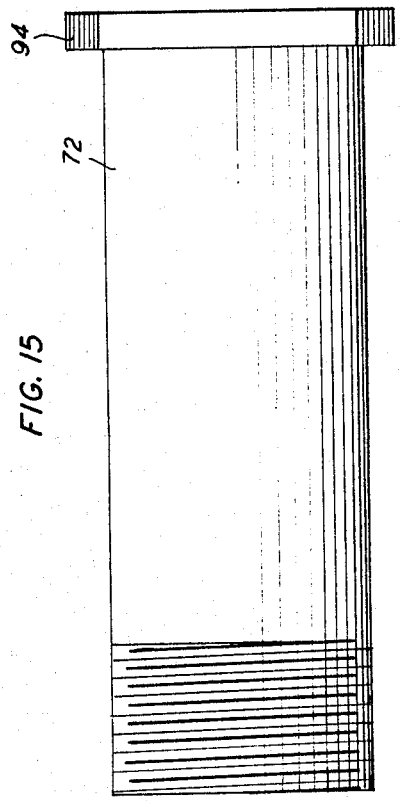
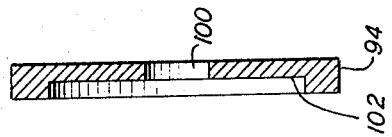
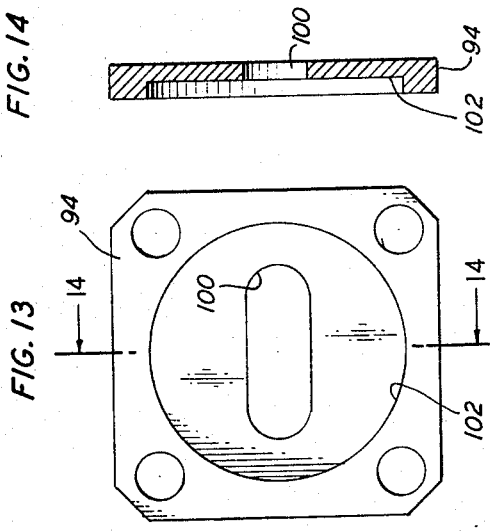
INVENTOR
EVERETT H. CUSHMAN
BY
Edmund W Bopp
AGENT

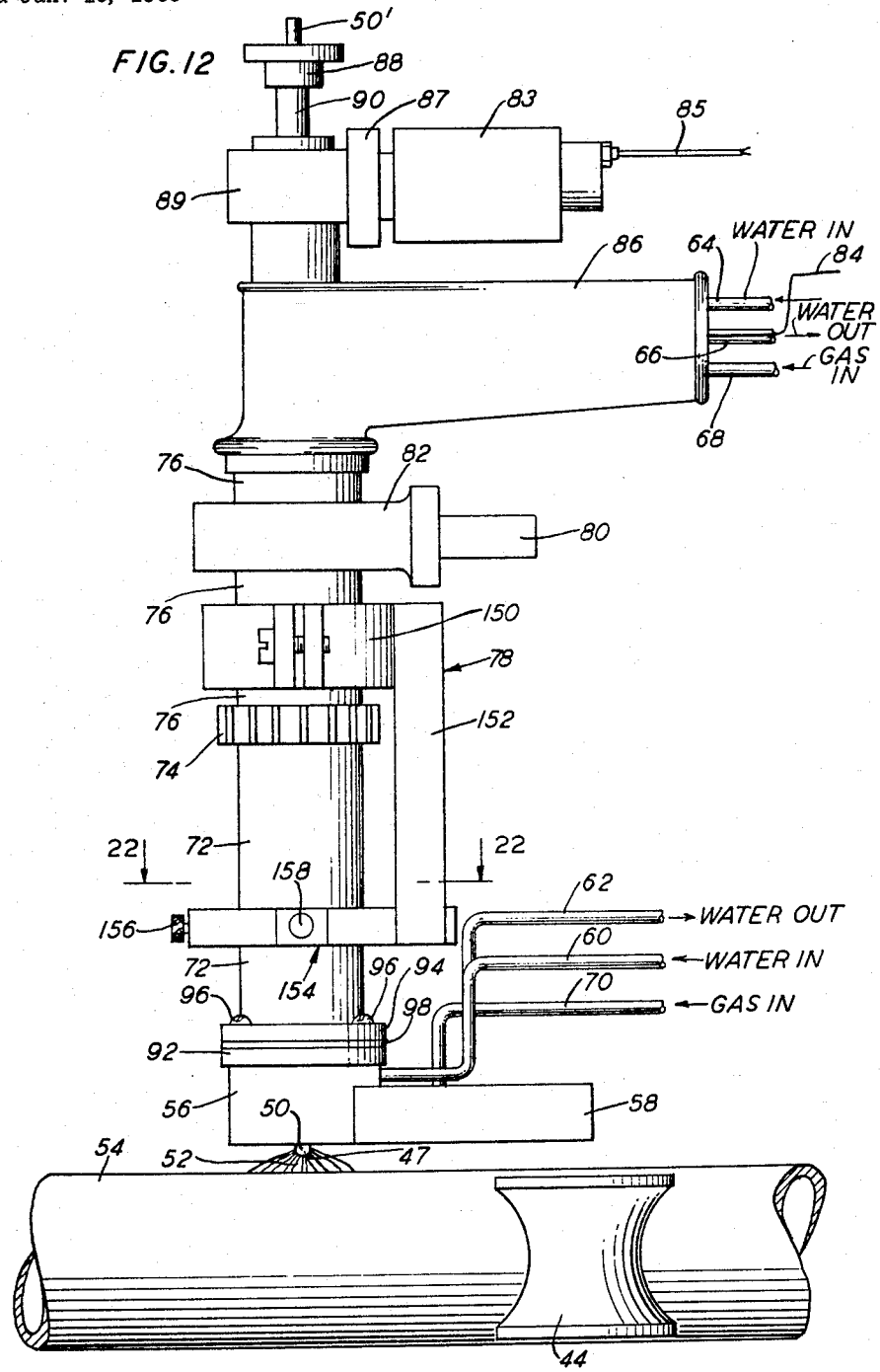

Sept. 27, 1966  E. H. CUSHMAN  3,275,786
HIGH SPEED BUTT WELDING METHOD AND APPARATUS
Filed Jan. 15, 1965  5 Sheets-Sheet 5

INVENTOR
EVERETT H. CUSHMAN
BY
Edmund W Bopp
AGENT

United States Patent Office 3,275,786
Patented Sept. 27, 1966

3,275,786
HIGH SPEED BUTT WELDING METHOD AND APPARATUS
Everett H. Cushman, South Plainfield, N.J., assignor to Air Reduction Company, Incorporated, New York, N.Y., a corporation of New York
Filed Jan. 15, 1965, Ser. No. 425,811
13 Claims. (Cl. 219—60)

This invention relates to continuous welding of abutting edges of metal plate or sheet and more particularly to improved methods and apparatus for inert gas shielded arc welding a continuous longitudinal seam in the manufacture of metal tubing.

Continuous formation of pipe or tubing by forming metal sheet stock into tubular configuration and welding the edges along their longitudinal seam as the edges are urged into abutting engagement, has been known and successfully practiced for many years. The conventional method of producing such pipe or tubing consists of forming initially flat metal strip into tubular formation by feeding the strip through a series of aligned and appropriately contoured pairs of forming rolls until a circular section is obtained with the opposite edges of the strip abutting, usually at the top of the tubing, in a more or less V-shaped seam. The thus formed tubular stock is fed into operative relation to a gas shielded arc welding head mounted adjacent to the tubing and carrying an electrode which projects, usually downwardly, from a shielding gas nozzle to a point immediately opposite the seam of the tubing. A welding arc is maintained between the electrode and the tubular stock as the stock is fed progressively past the electrode. The arc melts and fuses together the abutting edges of the seam into a continuous welded joint. It is well known in the art to locate the welding arc slightly before, opposite or after the rolls which close the joint. It is also known in the art to exert a forging pressure on the joint by additional rolls immediately following the fushion welding step. In the mass production of tubing, particularly of stainless steel tubing by the method generally described hereafter, considerable success has been achieved in providing welded tubing capable of satisfying the exacting standards of present day requirements. However, the conventional manufacturing process is relatively expensive to carry out primarily because of the relatively slow rate at which the work must be fed past the welding electrode.

It is an object therefore of the present invention to provide improved methods and apparatus for the continuous welding of abutting edges of metal sheet or the like that will produce welds of a quality equal or superior to those of present commercial practice at a substantially higher welding rate.

A more specific object is to provide improved methods and apparatus capable of substantially increasing the speed of welding the longitudinal seam of stainless steel tubing.

Another object is the provision of novel gas shielded arc welding apparatus.

Still another object is the provision of a novel welded product characterized by a high depth-to-width ratio in the weld zone.

These and other objects and advantages of the invention will be pointed out or will become apparent from the following detailed description and the accompanying drawings.

In the detailed description of the invention hereinafter set forth reference is had to the accompanying drawings, in which:

FIGURE 9 is a diagram useful in explaining the operation of the invention and in addition is a plan view looking up from the work toward the arc electrode of a novel magnetic nozzle and trailing gas shield member forming a part of the present invention;

FIGURE 11 is a plan view of a typical tube mill organization to which the invention has been applied;

FIGURE 12 is an elevational view of a welding machine embodying certain features of the invention;

FIGURE 13 is a top plan view of a flange shown in elevation in FIGURE 12;

FIGURE 14 is a cross-sectional view of the flange of FIGURE 13 taken along the line 14—14 in FIGURE 13;

FIGURE 15 is an elevational view of a nozzle member with the flange of FIGURES 13 and 14 attached;

FIGURE 19 is a phantom perspective view showing four magnets in place in the magnetic nozzle of FIGURE 17;

FIGURE 20 is a detailed cross-sectional view showing a convenient way of restraining a magnet in the magnetic nozzle of FIGURE 17;

FIGURE 21 is a top plan view of the restrained magnet in place as shown in sectional view in FIGURE 20;

FIGURE 22 is a top plan view of a centering device for use in adjusting a magnetic nozzle, which centering device appears in elevational view in FIGURE 12;

Figure 1:
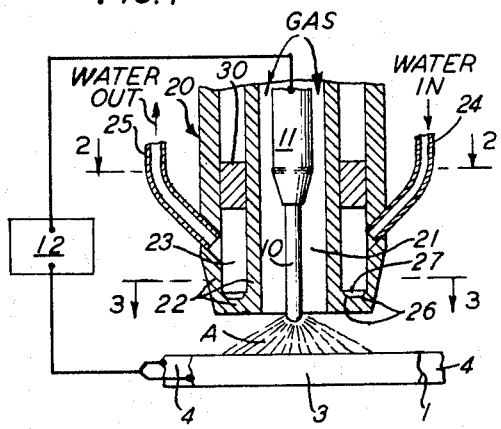
FIGURE 1 is a typical vertical cross-sectional view taken axially through the end portion of a welding electrode and surrounding shielding gas nozzle at right angles to the seam, showing elevationally therebeneath work to the welded, and schematically a welding machine electrically connected between the electrode and the work.
Figure 2:
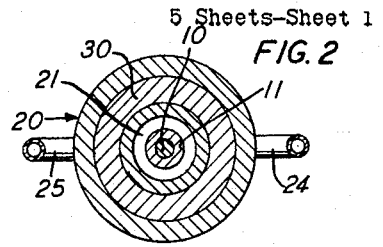
FIGURE 2 is a typical horizontal cross-sectional view taken along the plane designated by the line 2—2 of FIGURE 1.
Figure 3:
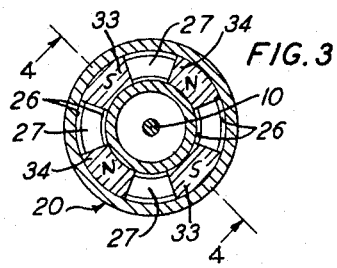
FIGURE 3 is a similar view taken along the plane designated by the line 3—3 of FIGURE 1.
Figure 4:
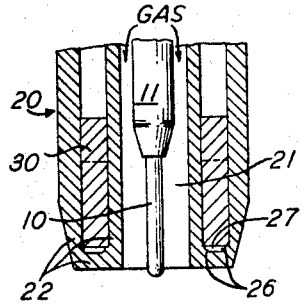
FIGURE 4 is a typical vertical cross-sectional view taken along the plane designated by the line 4—4 of FIGURE 3.

I have discovered that by magnetically shaping the arc in a specific manner, by application of the magnetically shaped arc to the seam just prior to closing the seam, by the proper selection of the arc shielding gas, and by proper selection of the arc current, voltage and spacing, I can increase the speed of welding of butt joints of metal stock in the thickness range of from 0.010 in. to 0.300 in. by a factor of from 2 to 6 or more while maintaining the quality of weld undiminished. In so doing, I form a welded joint having a greater depth-to-width ratio than the prior art. The aforesaid novel welding method involves the use of my novel welding head in which arc shaping magnets are enclosed in a water-cooled shielding gas nozzle disposed about the electrode. The form of the magnets and the magnetic circuits can vary, but it is essential that two pairs of poles (a pair of poles being one North magnetic pole and one South magnetic pole) be present in the vicinity of the gas discharge end of the nozzle and spacially oriented so as to confine the arc in a direction transverse to the seam being welded and to elongate the arc in a direction parallel to the seam being welded. Obviously the nozzle in which the magnets are enclosed must be non-magnetic in nature to permit the magnetic lines of force to project into the zone between the electrode and the workpiece as the magnetic circuit is completed from pole to pole.

It has long been known that the shape or direction of an electric arc (arc plasma) can be influenced by a magnetic field. Since the arc is an electrical conductor having its own surrounding magnetic field, it is quite evident under the laws of electromagnetism that a motor action will result when the arc exists in the presence of a magnetic field perpendicular to the direction of current flow in the arc. This of course tends to push the conducting plasma to one side thereby distorting the normal arc shape or direction. German Patent 645,938 and British Patent 823,504 both disclose welding arcs shaped by appropriately placed four pole magnetic systems to cause the arc to adopt a flattened shape that might appropriately be described as "fan-shaped" or "fishtail." It is suggested in these prior art patents that an arc of this form could beneficially be used to concentrate the arc heat along the seam being welded and thereby increase the efficiency of the welding operation. However, prior to my invention no practical and suitable apparatus has been available for the commercial application of this principle, particularly to tube welding, nor has a method and apparatus been devised to effectively utilize an arc flame of this type.

In order to fully explain my invention I shall disclose it as I have applied it to the manufacture of stainless steel tubing of varying diameter, for example from ¼ in. to 3 in., having a wall thickness within the range of from .010 in. to .300 in.

Reference being had to FIGURES 1 through 4, there will be seen the active end of a welding torch suitable for the practice of the invention. Herein there appear in elevation two members 3 and 4 abutted against each other to form a joint 1 (better seen in later figures) to be welded. Thereabove and spaced therefrom is the lower extremity of a nozzle member 20 of non-magnetic material having a central bore 21, axially within which there extends downwardly a smaller-diameter cylindrical electrode holder 11 terminating at some distance above the bottom end of the nozzle member 20; coaxially held in and extending downwardly from the electrode holder is an electrode 10, typically a non-consumable one formed of tungsten, the lower extremity of which may for example extend to just below the lower end of the nozzle member—it being understood that it is between the lower end portion of the electrode 10 and the members 3–4 that an arc will be caused to take place. The wall 22 of the nozzle member 20 (i.e. the portion lying between the bore 21 and the outer periphery of the member) may be of substantial thickness (for example of the same order of magnitude as the bore diameter) and within this wall excepting in its lower-most portion there may be formed an annular jacketing space 23; one function of this space is to accommodate a flow of cooling fluid (such as water), for which purpose there will be seen in FIGURE 1 two tubes 24 and 25 one for the ingress and the other for the egress of that fluid.

For the purpose of the present invention another use as well may be made of the jacketing space 23; this use is to hold a specially shaped magnet 30 in appropriate relation to the arc. Portions of the magnet are to be seen in each of FIGURES 1 through 4, but the magnet as an entirety is best seen in the perspective FIGURE 5. The magnet 30 may be described as basically a cylinder of wall thickness fitting within the jacketing space 23, from the lower end of which cylinder upwardly toward but not fully to its top the wall of the cylinder is cut away at four equiangularly spaced regions to form four inverted V-shaped voids 31—the cylinder wall remaining between those voids having the form of four equiangularly spaced legs 32. The magnet 30 is so magnetized that the bottom extremities of two mutually opposite ones of the legs 32 will be South poles 33, and that the bottom extremities of the other two legs (also mutually opposite) will be North poles 34.

The poles 33 and 34 may extend downwardly almost to the bottom of the annular jacketing space 23; to insure that they do not wholly close that space there may be provided in the lower corners of that space small shoulders 26 against which the poles may rest while leaving apertures 27 below the poles through most of the thickness of the space 23 thereby providing for passage of the cooling fluid between the voids 31. The continuous upper portion of the magnet 30 may if desired be suitably sealed across the jacketing space 23, in which event it will constitute an upper boundary for the cooling fluid; alternatively such a boundary may be constituted by any suitable means (not shown) at a higher level in which event such sealing of the upper magnet portion is unnecessary.

The nozzle member 20 is made of nonmagnetic material, for example copper, in order that the material of the nozzle will not modify the magnetic field pattern produced by the magnet 30, as for example by short-circuiting the magnetic field so that it will have little or no effect upon the shape of the arc, as is likely to occur if the nozzle contains ferromagnetic material.

It is essential that the magnet be located close to the arc. It is therefore essential to provide cooling for the magnet, since most permanent magnets tend to lose their magnetism when heated much above ambient temperatures. By applying adequate cooling, the life of the magnet can be prolonged indefinitely in spite of the proximity of the magnet to the heat zone of the arc.

It is also essential in practice to use the magnet within a protective covering to avoid accidental physical shocks or blows, which can also destroy the effectiveness of the magnet.

It is also essential that the magnet not interfere with the laminar flow of shielding gas about the electrode and the arc.

For such reasons as these, I place the magnet or magnets within walls of nonmagnetic material of the shielding gas nozzle and provide circulation of a coolant continually over the surfaces of the magnet during use in a welding operation.

The discription of the apparatus of FIGURES 1–5 may be completed by noting that means (not shown) may be provided for maintaining a flow of shielding gas downwardly within the bore 21 about the electrode holder 11 and electrode 10, and by noting that a suitable welding machine or other appropriate source 12 of welding current will be connected (as schematically shown in FIGURE 1) between the electrode holder on the one hand and the members 3–4 on the other. Such gas is preferably composed of an inert gas (by which term I mean to include not only a single inert gas but also mixtures of two or more inert gases), together with appropriate additives, if desired.

It has been shown that with magnet poles disposed as are 33 and 34 in surrounding relationship to the arc electrode adjacent its arcing tip the arc is elongated in one direction and contracted in the direction at right angles to the first; speaking in terms of a clock face and referring to FIGURE 9, if the arc current is directed into the plane of the paper and, if the South poles are positioned between 1 and 2 o'clock and between 7 and 8 o'clock, and the North poles between 4 and 5 o'clock and between 10 and 11 o'clock, the direction of elongation will be 3–9 and that of contraction will be 6–12. The cross-sectional contour of the arc flame is indicated at 131.

Figure 6:
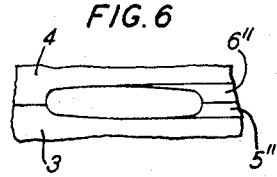
FIGURE 6 is a typical view at the surface of the work showing the intersection therewith of the arc.
Figure 7:
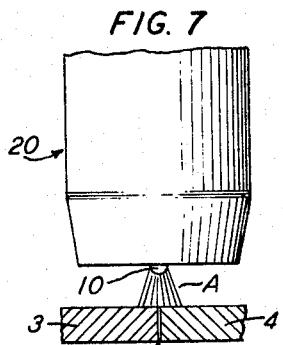
FIGURE 7 is an elevational view of the nozzle and electrode, taken along the seam, with typical work to be welded appearing in cross-section therebeneath.
Figure 8:
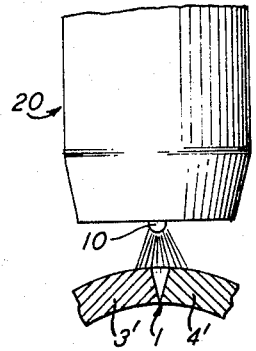
FIGURE 8 is a similar view showing specifically different work to be welded.

FIGURE 1 has illustrated the elongation of the arc as seen looking at right angles to the joint; FIGURE 7 illustrates the contraction of the same arc as seen looking along the joint, and FIGURE 6 illustrates both the elongation and the contraction. FIGURE 8 duplicates the showing of FIGURE 7, except that at replaces the flat members 3 and 4 with the arcuate members 3' and 4' which may be the respective edge portions of unitary strip material which has been formed into a tube which requires welding along the joint to complete its structure as a tube.

In addition to shaping the arc flame, the shaping magnets provide a relatively constant magnetic field which is strong enough to dwarf random variations in ambient magnetic field which might otherwise cause the arc to wander.

The elongation of the arc flame along the seam tends to prevent the arc from attaching to a hot spot on the seam and clinging until such time as the lengthening of the arc causes it to leave that spot and jump to another. Instead, the fan-shaped arc is spread over an extended length of the seam and does not dwell unduly long on any spot.

Figure 5:
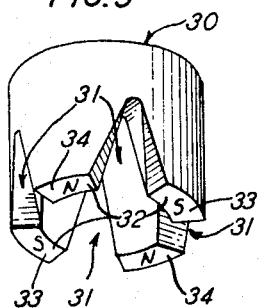
FIGURE 5 is a perspective view of the permanent magnet which appears in section in previous figures.
Figure 10:
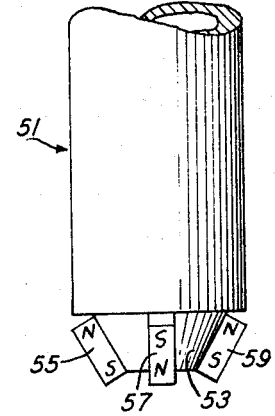
FIGURE 10 is an elevational view of a variant form of a magnetic nozzle, differing somewhat from the form shown in FIGURES 1–4.

FIGURE 10 shows a variant configuration of magnetic elements. Whereas in the arrangement of FIGURES 1–5 a unitary magnetic structure 30 is provided which has four poles located near the arc supporting tip of the electrode 10, FIGURE 10 shows the use of four separate bar magnets (of which three are visible in the view and one is hidden). One of the bar magnets, numbered 55 has a South pole at the bottom and a North pole at the top. Another, 57, has a North pole at the bottom and a South pole at the top. A third, 59, has a South pole at the bottom and a North pole at the top. The hidden bar magnet will have a North pole at the bottom and a South pole at the top. The magnetic poles at the bottom have the same configuration of alternate polarities as found in the magnet 30 as shown in FIGURE 5. The bar magnets in FIGURE 10 are fastened at equally spaced intervals around the periphery of a tapered portion 53 of a nonmagnetic nozzle 51. While an organization as shown in FIGURE 10 has been used successfully in actual welding as well as in simulated test runs, the magnets should be cooled and protected from accidental injury as by enclosing them in a nonmagnetic water jacket (not shown).

Using the type of magnetic nozzle shown in FIGURE 10, comparisons were made with typical results obtained with tungsten electrode gas shielded prior art welding. Two sets of tests were made on one-eighth inch thick type 321 stainless steel by running the welding tool along the surface of the plate, then cutting and etching the plate to determine the depth of penetration of the fused zone. In a test at a linear speed of the arc of 20 inches per minute, with 200 amperes welding current, the penetration using the unshaped arc was 45 percent of the thickness of the plate, whereas with the magnetically shaped arc the penetration was 100 percent. The width of the weld bead was 0.28 inch in the prior art test, giving a depth-to-width ratio for the weld of 0.21. For the shaped arc, the width of the bead was 0.21, giving a depth-to-width ratio of 0.60. In a test at 30 inches per minute, with 250 amperes welding current, the penetration using the unshaped arc was 63 percent, compared with 100 percent for the magnetically shaped arc. For the unshaped arc, the bead width was 0.30 and the depth-to-width ratio 0.27, whereas for the magnetically shaped arc the bead width was 0.24 inch an the depth-to-width ratio was 0.52. Actual square butt welds were made between one-eighth inch thick plates of type 321 stainless steel at 35 inches per minute, with a welding current of 210 amperes, at an arc voltage of 25.5 volts using as shielding gas argon with an addition of 20 percent of hydrogen. In these welds the penetration was 100 percent. The highest speed obtained in comparison welds using prior art equipment and methods was 25 inches per minute.

Using the type of magnetic nozzle illustrated in FIGURES 1–5, square butt welds were made between plates of one-eighth inch thick type 304 stainless steel, with welding current 360 amperes, arc voltage estimated at about 27 volts, and with shielding gas argon with 20 percent addition of hydrogen. One hundred percent penetration in good welds was obtained at a speed of 70 inches per minute.

It is known that the prime factor which determines the cost of production, and hence the commercial success, of a present day tube mill is the speed at which the formed stock can be passed through the welding machine. It is necessary that the weld be accomplished in a single pass, and that the weld be of the required strength and free from porosity detectable by X-ray examination. It is essential that the weld penetrate completely through the tube wall without undue sagging at the bottom of the weld, and that the weld be formed without objectionable undercutting or ridging at the top or outer surface of the tube.

Although it has been known in the welding art for several years that a fan-shaped arc is capable of concentrating its heat along a seam without wasteful heating of the metal to an undue extent on both sides of the seam, and although many persons have attempted by various means to increase the speed of welding in tube mills, no practical device has heretofore appeared which has been able to increase the speed by any substantial factor such as has resulted from the introduction of my magnetic nozzle and my welding methods herein disclosed, while at the same time maintaining or even improving upon the quality of the tube produced.

I have made particular application of my invention to a tube mill of a well known type shown schematically in FIGURE 11, in which a sheet metal strip 40 of the desired composition is drawn from a coil 41 and fed through a series of forming dies or rolls only the last set of which is indicated at 42. As the material leaves the rolls 42, it is in the form of a nearly closed tube having an unwelded seam 43 which is generally V-shaped in cross section.

From the rolls 42, the strip which has been so formed is drawn through a pair of squeeze rolls 44 mounted for rotation about usually vertical axes on opposite sides of the feed path, gradually closing the seam as the formed strip moves from the rolls 42 to the rolls 44, the seam being usually vertically disposed at the top of the tube, preferably, the squeeze rolls 44 are mounted so as to facilitate ready adjustment of the distance between the rolls 44 and the pressure applied thereby to the tubing. To assure that the seam maintains a fixed angular position, one or more circular disks 45 are rotatably mounted over the feed path each on a spindle 46 between the rolls 42 and the rolls 44 so that the tapered edge of the disk 45 extends into the seam.

With squeeze rolls 44 adjusted to bring the fused metal of the seam into the proper shape for a good weld, the unwelded seam as viewed from above in FIGURE 11 in the absence of an arc is in the form of an elongated V with the opposite surfaces of the seam coming together under pressure at the pinch line or center line of the squeeze rolls 44. The tip of the arc electrode is indicated schematically at 47 and a nozzle for providing shielding gas is indicated schematically at 48 at a location upstream of the rolls 44, for example from about one inch to an inch and a half upstream, according to the amount of separation which it is desired to have between the sides of the seam at the point where the weld is being made.

FIGURE 12 shows the general organization and external appearance of my novel welding head embodying arc shaping magnets enclosed in a water-cooled shielding gas nozzle disposed about the arc electrode. An extension rod 50' which is to be understood as being attached to the upper end of an arc electrode 50 is shown with one end extending from the top of the welding head. The arc supporting tip 47 of the electrode 50 is visible at the bottom of the head and a fan-shaped arc flame 52 is shown playing upon a seam at the top of a tube 54. The electrode 50 extends through a central opening in a magnetic nozzle or transfer block 56, to which is appended a trailing gas shield member 58. In practice, I find it best to use a relatively close spacing between the bottom of the members 56, 58 and the work surface of the tube 54, preferably about 0.050 inch. I prefer to strike the arc with the electrode tip 47 at or slightly below the level of the bottom of the members 56 and 58 in order that the arc will fall upon the work and not jump instead to some portion of the transfer block 56. In some cases I find it advisable to lengthen the arc somewhat after the arc is established.

Cooling water for the transfer block 56 is supplied through conduits 60, 62, for example in through conduit 60 and out through conduit 62. Cooling water for the main portion of the welding head is supplied in through a conduit 64 and out through a conduit 66. Shielding gas is supplied to the main portion of the welding head through a conduit 68 and to the trailing gas shield member 58 through a conduit 70, which conduits may, if desired, carry gases of two different compositions.

The ordinary nozzle of the welding head is shown at 72, secured in a threaded collar 74 rotatably attached to the upper portion or barrel 76 of the welding head. A centering device 78 for centering the transfer block 56 with reference to the electrode 50 is clamped to the barrel 76 and carries adjusting means which bear upon the nozzle 72 in manner more particularly described below. A head supporting member 80 is fastened to the barrel 76 by means of a clamp 82. The welding current conductor is shown at 84 and it preferably is insulatingly enclosed in the stream of cooling water which is flowing away from the welding head in conduit 66. An insulating boot 86 is used as a protective covering for the conduits 64, 66 and 68. A knob 88 is provided surrounding the electrode extension rod 50' and attached to a hollow tube 90, the knob being for tightening and loosening a gripping means within the barrel 76 to permit manual release and replacement of the electrode 50.

An electrically controlled reversible stepping motor is represented diagrammatically at 83 with incoming electrical connection at 85. The motor is connected through a gear box 87 to an electrode moving member 89 through which the rod 50' passes. The motor 83 is used in practice principally in a system of automatic control of the arc length, whereby the electrode 50 is moved up and down in response to variations in arc voltage which are indicative of variations in arc length, as is well known in the art. The motor 83 is also customarily equipped with manually operable means for effecting small up and down movements of the electrode 50, and may be so used for adjusting the position of the electrode tip 47 during arc starting and to obtain the desired operating position of the electrode. Usually automatic control of arc length will not be necessary, and simpler means may be provided to adjust the arc length after striking the arc.

The transfer block 56 includes a flange member 92 which is joined to a matching flange 94 attached to the nozzle 72 by bolts 96 which compress a gasket 98.

The welding head shown in FIGURE 12 may be of the type described in U. S. Patent 3,059,098, issued October 16, 1962 to N. E. Anderson and assigned to the same assignee as the present application, except for certain modifications herein described. The principal modifications are the truncation of the bottom end of the nozzle 72, the addition to the nozzle of the flange 94, gasket 98, flanged transfer block 56 and shield member 58 with water and gas supplies therefor, and the centering means 78.

Figure 16:
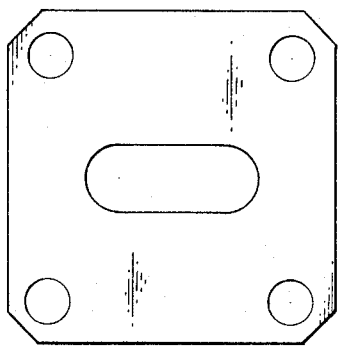
FIGURE 16 is a plan view of a gasket shown in elevation in FIGURE 12.

FIGURE 13 is a top plan view of of the flange 94 and FIGURE 14 is a cross-sectional view along the line 14—14 in FIGURE 13. The flange 94 has a central elongated slot 100 through which the electrode 50 and shielding gas from conduit 68 pass. A recess 102 is provided to receive the lower end of the nozzle 72. FIGURE 15 shows the nozzle 72 with the flange 94 attached. FIGURE 16 is a plan view of the gasket 98.

Figure 17:
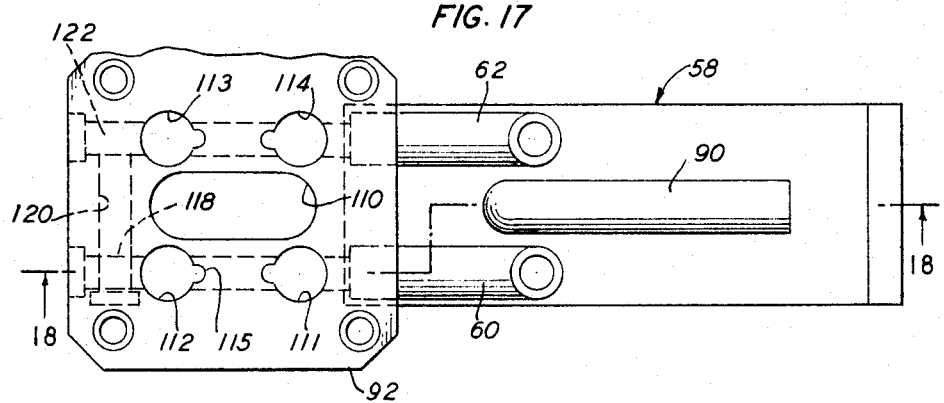
FIGURE 17 is a top plan view of a magnetic nozzle or transfer block viewed as detached from the flange of FIGURES 13 and 14.
Figure 18:
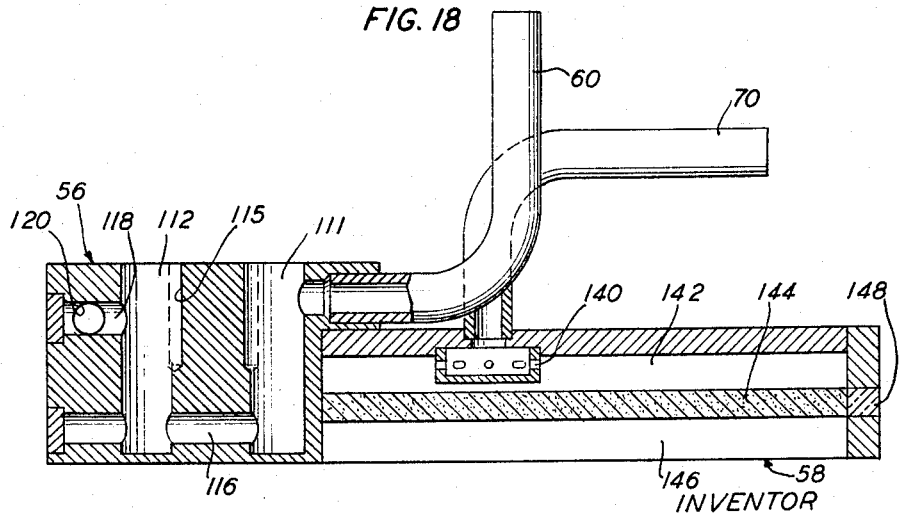
FIGURE 18 is a cross-section taken along the line 18—18 in FIGURE 17, showing the inner configuration of the members shown in plan view in FIGURE 17.

FIGURE 17 shows the transfer block 56 and trailing gas shield member 58 in top plan view, detached from the flange 94, and FIGURE 18 shows a cross section showing the inner configuration of these two members.

The transfer block 56 is made of non-magnetic material, for example copper. It may consist of a solid metallic block with inner passageways formed by a plurality of machinings or drillings. The flange 92 is preferably an integral part of the block 56. A central slot 110 registering with the passageway 100 in the flange 94 and with the similarly shaped central hole in the gasket 98 is machined clear through the block 56 in the vertical direction. Holes 111 and 112 extend from the top of the block 56 vertically downward with flat bottoms close to the bottom of the block. The center line of the holes 111, 112 is parallel to the longitudinal axis of the slot 110. A similar pair of holes 113, 114, is located on the opposite side of the slot 110 from the holes 111, 112. The four holes 111–114 are preferably located at the respective corners of a square which is centered at the center of the slot 110. Each of the four holes has a vertical groove 115 formed in its wall.

The conduit 60 for incoming coolant connects through a passageway in the block 56 into the hole 111 at a point near the top of the hole. A drilled and plugged passageway 116 connects holes 111 and 112 near the bottom of the holes. A drilled and plugged hole 118 near the top of hole 112 connects the hole 112 by way of another drilled and plugged hole 120 at right angles to the hole 118, and a drilled and plugged hole 122 to a point near the top of the hole 113. Similar passageways connect the holes 113 and 114 near the bottoms of these holes and connect hole 114 with the conduit 62 for outgoing coolant. The holes 111–114 are sealed off at the top by the gasket 98.

Each of the holes 111–114 when in use contains one of four permanent magnets 111', 112', 113', and 114', conveniently of square cross-section, extending vertically as shown in phantom perspective view in FIGURE 19. Magnets 111' and 113' are arranged in like polarity, for example with South poles below and North poles above. Magnets 112' and 114' are arranged in like polarity to each other and in opposite polarity to the pole pair 111', 113', the magnets 112' and 114' having North poles below and South poles above.

FIGURE 9, previously mentioned, shows in diagrammatic form the magnetic poling scheme as viewed looking upward from the work toward the arc electrode, for the case of straight polarity welding. In this case, the welding current is flowing in the direction into the paper of the drawing. The magnetic field between the magnets 111' and 112' is in the same direction as the adjacent portion of the magnetic field of the welding current in the arc. Also, the magnetic field between the magnets 113' and 114' is in the same direction as the adjacent portion of the magnetic field of the welding current in the arc. The result of the combined field of the magnets and of the arc is to cause the arc flame to fan out as indicated by a contour 131 in a line substantially parallel to the center line of the magnets 111' and 112', and equivalently stated, parallel to the center line of the magnets 113' and 114'.

The direction of the arc current is represented diagrammatically by the arrow tail 130.

FIGURES 20 and 21 show a convenient way for restraining the magnets from shifting position. The magnet 111' is shown for purposes of illustration. The magnet, of square cross-section is fitted so as to bear its corners upon the walls of the circular hole. A spring clip 132 of hooked shape is placed with its shank portion and its hook tip in the groove 115, with the hook part in compression between the top of the magnet and the underside of the gasket 98. The clearance spaces between the square magnets and the circular containing walls are sufficient to permit the necessary flow of coolant around and past the magnets, in order to keep the magnets from being overheated by the heat of the arc, which would otherwise soon render the magnets ineffective due to a de-magnetization in the heated state. The coolant circulation is serially through the holes in the order 111, 112, 113, 114.

Bar magnet stock which I have found suitable for my purpose is made of an aluminum-nickel-iron alloy and may be obtained from Permag Corporation of Jamaica, New York; for example under the trade designation of cast Almico 5 permanent magnets No. 5S10A.

The trailing gas shield member 58, shown generally in FIGURES 17 and 18, is made of non-magnetic materials in order not to disturb the magnetic fields of the magnets and of the arc. It is so dimensioned as to be attached to the transfer block 56, and together with the block to occupy a minimum of width, thereby assuring that the combined devices can pass through a restricted space customarily available between squeeze rolls or other fixtures in a tube mill. The shield member may be made principally of brass, for example, inasmuch as it is further from the arc than the transfer block and does not require as great heat conductive capacity as does the transfer block, which latter is preferably made of copper, as mentioned above. Otherwise, the shield member may be of conventional design. It may contain a diffusion chamber 140 connected between the gas conduit 90 and an upper gas chamber 142 (FIGURE 18). The shield member may also contain a porous block or filter 144, for example of Porex through which the shield gas is further diffused and delivered along the length of a longitudinal slot 146 in the bottom of the member 58, which slot constrains the gas to a region covering the solidifying weld strip as the tube passes beyond the arc zone, in known manner. The filter 144 may be inserted into the member 58 through a suitable slot in the rear end of the member 58, whereupon the slot may be sealed by means of a plug 148.

The centering device 78 comprises an upper member 150 (FIGURE 12) which is a clamp which can be firmly attached to the barrel member 76, and a vertical spacing member 152 attached to the clamp member 150 and supporting in turn a centering member 154 which is adjustably clampable to the nozzle 72. The centering member 154 is shown in plan view in FIGURE 22. The member 154 fits loosely around the nozzle 72 near the lower end of the nozzle. Adjusting screws 156 and 158 are threadedly engaged respectively at two adjacent corners of the members 154. Spring loaded plungers 160, 162 are provided at the remaining corners of the member 154. By adjusting the screws 156 and 158 against the pressure of the plungers 160 and 162 respectively, forces may be exerted upon the nozzle 72 tending to move it slightly in any lateral direction. It will be noted with reference to the Anderson patent above cited that the nozzle in that patent which corresponds to nozzle 72 is held in yielding resistance to lateral pressure by a pair of O-rings, designated 154 and 156 respectively in FIGURE 7 of that patent, which O-rings have the primary function of sealing off a passageway for coolant within the nozzle. As it will be evident from this FIGURE 7 of the patent that the electrode 50 is substantially rigidly supported by the barrel 76, it follows that the centering device 78 is effective to alter the position of the magnets 111'–114' relatively to the electrode tip 47 and hence to adjust the magnetic field pattern and so to adjust the configuration of the fan-shaped flame of the arc. In particular, if the magnetic field is unsymmetrical, the flame will be emitted at an angle that is off from the vertical. By adjustment of the screws 156 and 158, the flame may be made to be substantially vertical in its principal plane.

In the apparatus heretofore described the magnetic lines of force extend into the space between the lower end of the water-cooled nozzle and the work surface adjacent the arc and as previously explained act to contract the arc in one direction and elongate it in the direction parallel to the weld seam. I have found however that there are other important factors that contribute to the vast improvement in welding speed that I have achieved other than the use of the magnetically shaped arc.

One such factor is the proper selection of the arc shielding gas. I have found that the magnetically shaped arc is particularly effective in increasing the welding speed with no sacrifice in weld quality if the shielding gas employed contains from 5% to 30% hydrogen and the balance substantially all monatomic inert gas, preferably argon. It is believed that the hydrogen addition has the effect of narrowing the normal expansion of the arc and increasing the current density in the arc. It is believed further that the increased current density in the arc makes the arc more responsive to the influence of the magnets. For this reason the benefits derived, i.e., welding speed accomplished, when the magnetically shaped arc is used in conjunction with the hydrogen containing gas shield, are greater than would be anticipated by the straight cumulative effect of these two factors.

Another factor that contributes to the improvement achieved pertains to the simultaneous use of the magnetically shaped arc and an open seam. When the welding arc is caused to act on a totally closed butt joint, welding is accomplished by heat transfer and arc penetration from the surface of the metal to be welded. While it has been known in the art to increase the effective welding speed by causing the arc to play directly on the spaced opposed surfaces to be joined and subsequently closing the seam, I have found that much greater benefit is achieved by the use of my magnetically flattened arc aligned with and projecting into the open seam. Here again the advantage gained is believed to be more than cumulative in that virtually all of the arc heating can be caused to take place at or near the faces of the parts to be welded and therefore more efficiently utilized.

Still another element in the combination I have discovered that enables me to weld at spectacularly higher speeds than has heretofore been possible, is the use of my magnetically shaped arc in the welding of non-magnetic materials. As previously explained the arc is shaped by the magnetic interaction of the current carrying plasma with the magnetic lines of force generated by the magnets, with the effective shaping action coming from the components of the magnetic lines of force that lie in the plane parallel to the surface of the work, and in the zone bounded by the plane of the tip of the electrode on the one hand and the plane of the surface of the work being welded on the other. When the welding operation is being performed on non-magnetic material, the magnetic lines of force are effectively distributed in the desired zone and greatest advantage is derived from the process. When however, the workparts are ferromagnetic in nature, more of the magnetic lines of force are concentrated in the workpart itself in their traverse of the path from one pole piece to the next. This tends to reduce the effectiveness of the magnet, making the process less beneficial for the welding of ferromagnetic materials than for the welding of non-magnetic materials.

Figure 23:
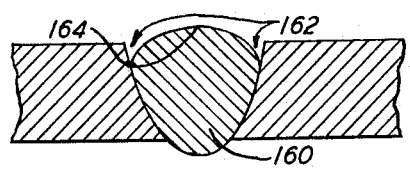
FIGURE 23 is a diagram useful in explaining an effect known in the welding art as undercutting.

Prior to my invention attempts to further increase tube welding speed above the speeds now commercially practiced have resulted in undercut, bead irregularity, weld sag and even drop-out. These effects result from attempts to increase welding current beyond acceptable limits of the process. It is believed that the fundamental reason there is an upper limit on the current that can be tolerated is because the conventional arc in addition to heating the metal to be joined at the seam also necessarily and inherently heats and fuses a great deal more metal adjacent to the seam than is required to make a good fusion weld. The fusion of this adjacent metal is largely responsible for the undercut and sagging and other undesirable side effects resulting from attempts to increase welding speed by increasing welding current. According to my invention however, virtually all of the heating is accomplished at the seam where the welding takes place and much more heat can be applied in this narrow zone without detrimental effects than can be applied with the conventional process. Thus in the prior art if the welding current is increased in order to obtain the desired penetration at an increased welding speed, several undesired results may follow. The weld will be widened with attendant wasteful heating of metal in a too wide area on both sides of the seam. Also, the weld may sag or even tend to drop out through the bottom of the seam. Further, there may be undercutting. The latter effect, which is known in the art, is illustrated in FIGURE 23 wherein the weld is shown in cross-section at 160, grooves 162 are left in the solidified metal at the sides of the weld bead and a ridge 164 appears at the center of the bead.

To illustrate the notable and unexpected improvement in mill speed obtained by use of this invention on a commercial tube mill as compared with the highest mill speed obtainable with the required quality of product using the best known prior art methods of operation, I will cite two examples.

Example I: Tube wall 0.150 inch, outside diameter 2⅜ inch, type 304 stainless steel (a non-magnetic material), thoriated tungsten electrode; power supply D.C. drooping volt-ampere characteristic, about 70 volts open-circuit; welding current about 400 amperes. Electrode tip conical; angle of tip about 60 degrees. The arc was ignited with the aid of a high frequency spark with the electrode tip about 0.050 inch above the work and after starting the weld the electrode was retracted from the work increasing the arc length until the arc voltage was about 25 volts. The arc was applied to the open seam at a location about one and three-sixteenths inches before the center line of the squeeze rolls. The shielding gas around the electrode was argon plus 12 percent hydrogen, flowing at about 24 cubic feet per hour; the shielding gas in the trailing shield member was the same gas mixture at about 50 cubic feet per hour, and pure argon was supplied at about 13 cubic feet per hour inside the tube to protect the underside of the weld. The mill speed was set at 70 inches per minute. The resulting tube was of equal or superior quality to that which has been obtained under the best prior art practice when the maximum mill speed was only 12 inches per minute. The weld in cross section was characterized by a relatively great depth-to-width ratio.

Example II: Tube wall 0.109 inch, outside diameter 2⅜ inch, type 304 stainless steel. Conditions of operation the same as in Example I except that the welding current was about 270 amperes. The mill speed was set at 50 inches per minute. Again, the resulting tube product was of equal or superior quality to that which had been obtained under the best prior art practice when the maximum mill speed was only 18 inches per minute.

The results of the above two examples are summarized in the following table:

| Wall Thickness, Inches | Prior Art Speed, Inches Per Minute | Speed Using This Invention, Inches Per Minute |
| --- | --- | --- |
| 0.150 | 12 | 70 |
| 0.109 | 18 | 50 |

In both of these examples, the position of the magnetic nozzle or transfer block relative to the electrode was adjusted so that the fan-shaped plasma sheet of the arc was substantially in a vertical plane passing through the seam.

To provide an on-the-job check on the completeness of penetration, it is in some cases advantageous to make use of the effect known in the art as "key-holing." Key-holing occurs when the force of the arc blows a small hole entirely through the molten pool directly beneath the arc electrode. If the hole is not too large, the molten metal fills in the hole immediately after the electrode passes over the spot. There may thus be at all times such a hole directly under the electrode, the hole apparently moving along the seam as the molten metal flows in behind it.

Figure 24:
FIGURE 24 is a schematic representation in cross-section of a weld which exhibits an effect known in the art as key-holing.

FIGURE 24 shows schematically a section through a weld directly under the arc electrode. There is a key hole 176 that has been blown open by the arc in passing, the hole being of conical shape as the bulk of the molten metal has been blown aside. The thin layer of molten metal remaining appears at 174. As above noted, the molten metal will refill the hole behind the arc. If the operator can observe a plume of the arc emerging through such a hole in the bottom of the molten pool, it is assurance to him that the weld is achieving 100 percent penetration.

While permanent magnets have been shown herein, it will be evident that electromagnets may be used instead.

While illustrative forms of apparatus and methods in accordance with the invention have been described and shown herein, it will be understood that numerous changes may be made without departing from the general principles and scope of the invention.

I claim:

1. The method of electric arc fusion welding of a substantially straight seam in non-magnetic material, using a substantially non-consuming arc electrode relatively progressively moved along the seam to be welded, which method comprises the steps of
    (a) applying magnetic forces in the arc zone to shape the arc flame into a form elongated along a given long axis and constricted in the direction perpendicular to said axis,
    (b) shielding the arc zone from the ambient atmosphere with inert shielding gas to which has been added 5 to 30 percent of hydrogen,
    (c) applying the thus shaped and shielded arc to the seam with the arc flame aligned with its long axis along the line of the seam, and
    (d) applying electric power to the arc at a rate suitable to secure complete penetration of the weld through the work.

2. The method of electric arc fusion welding of a longitudinal seam in non-magnetic metal tubing during fabrication thereof from sheet stock, using a substantially non-consuming arc electrode relatively progressively moved along the seam to be welded, which method comprises the steps of
    (a) applying magnetic forces in the arc zone to shape the arc flame into a form elongated along a given long axis and constricted in the direction perpendicular to said axis,
    (b) shielding the arc zone from the ambient atmosphere with inert shielding gas to which has been added 5 to 30 percent of hydrogen, (c) applying the thus shaped and shielding arc to the seam with the arc flame aligned with its long axis along the line of the seam at a location along the tubing where the edges of the seam have been brought close together in fabrication but the seam is not closed, (d) applying electric power to the arc at a rate suitable to melt both edges of the tubing to the full thickness of the material of the tubing, and (e) thereafter applying suitable pressure to the tubing to close the seam while the edges are still molten.

3. A magnetic nozzle for shaping an arc flame, comprising, in combination, a block of non-magnetic material of relatively high heat conductivity, said block having a central passage therethrough to accommodate an arc electrode and to provide space for delivering shielding gas in surrounding relationship to said electrode, and said block having a plurality of cavities therein arranged substantially parallel to and surrounding said central passage, a plurality of magnetic elements disposed within the respective cavities, means to circulate a coolant fluid through said cavities, and means to seal off said cavities to avoid loss of coolant fluid.

4. A magnetic nozzle for an electric arc welding head, comprising, in combination, a block of non-magnetic material having an elongated slot therethrough for accommodating the electrode of the arc surrounded by a stream of shielding gas, said block being provided with an even number of cavities each elongated in the direction parallel to the line of the arc electrode and spaced at substantially equal angular intervals around said slot, a plurality of magnets disposed respectively within said cavities with their axes substantially parallel to the line of the arc electrode, adjacent ones of said magnets being arranged with like poles in opposite directions, the configuration of the magnets being such as to augment the magnetic field of the arc electrode current in the direction parallel to the long axis of the said elongated slot and to diminish the magnetic field of the arc electrode current perpendicular to the said axis of the elongated slot.

5. Apparatus according to claim 4, in which said cavities provide open spaces surrounding the respective magnets, and in which there is provided means to circulate coolant fluid in said open spaces.

6. Apparatus according to claim 5, in which said cavities are serially connected to provide circulation of said coolant fluid through the respective cavities in series.

7. The method of electric arc fusion welding of a longitudinal seam in non-magnetic metal tubing during fabrication thereof from sheet stock, using a substantially non-consuming arc electrode relatively progressively moved along the seam to be welded, which method comprises the steps of (a) applying magnetic forces in the arc zone to shape the arc flame into a form elongated along a driven long axis and constricted in the direction perpendicular to said axis, (b) shielding the arc zone from the ambient atmosphere with inert shielding gas, (c) applying the thus shaped and shielded arc to the seam with the arc flame aligned with its long axis along the line of the seam at a location along the tubing where the edges of the seam have been brought close together in fabrication but the seam is not closed, (d) applying electric power to the arc at a rate suitable to melt both edges of the tubing to the full thickness of the material of the tubing, and (e) thereafter applying suitable pressure to the tubing to close the seam while the edges are still molten.

8. A welding method according to claim 2 comprising the further step of shielding the solidifying weld trailing the arc with a shielding gas supplied from an elongated hood overlying the seam in back of the arc.

9. Gas shielded electric arc welding apparatus comprising an electrode, means to support said electrode in arcing relation to a workpiece, a non-magnetic nozzle surrounding said electrode adapted to direct a flowing stream of shielding gas around the arc end of said electrode, the arc, and the metal melted by said arc, means forming a cooling fluid passage within said nozzle, and magnet means in said cooling fluid passage capable of deforming the cross section of an arc formed between said electrode and said workpiece by contracting said cross section along a first axis transverse to the axis of said arm and elongating said cross section along a second axis perpendicular to said first axis and transverse to the axis of said arc.

10. Gas shielded electric arc welding apparatus according to claim 9 in which said magnet means comprises two pairs of alternately arranged north and south pole pieces symmetrically arranged about the said electrode.

11. Gas shielded electric arc welding apparatus according to claim 10 in which the magnetic axes of the said pole piece are oriented in the same general direction as the said electrode.

12. Gas shielded electric arc welding apparatus according to claim 10 in which the said pole pieces are parts of a single magnet structure.

13. Gas shielded electric arc welding apparatus according to claim 10 in which the said pole pieces are parts of a plurality of magnet structures.

References Cited by the Examiner

UNITED STATES PATENTS

| | | | |
|---|---|---|---|
| 1,980,447 | 11/1934 | Stine | 219—123 |
| 2,497,631 | 2/1950 | Rothschild | 219—74 |
| 2,654,014 | 9/1953 | Schaefer | 219—60 |
| 2,666,122 | 1/1954 | Curtin et al. | 219—123 |
| 2,604,129 | 11/1954 | Yenni | 219—123 |
| 2,702,846 | 2/1955 | Breymeier | 219—74 |
| 2,844,705 | 7/1958 | Bowman et al. | 219—61 |
| 2,856,510 | 10/1958 | Jones et al. | 219—74 |
| 2,902,587 | 9/1959 | Bernard | 219—74 |
| 2,905,805 | 9/1959 | McElroth et al. | 219—137 |

FOREIGN PATENTS 823,504   11/1959   Great Britain.

RICHARD M. WOOD, *Primary Examiner.*